United States Patent [19]

Geyer et al.

[11] Patent Number: 4,866,148

[45] Date of Patent: Sep. 12, 1989

[54] HYDROPHILIC COPOLYMERS, THE USE THEREOF AS BIOMEDICAL MATERIALS AND CONTACT-OPTICAL ARTICLES PRODUCED THEREFROM

[75] Inventors: Otto-Christian Geyer, Wetzlar; Frank Wingler, Leverkusen, both of Fed. Rep. of Germany

[73] Assignee: Bayer Aktiengesellschaft, Leverkusen, Fed. Rep. of Germany

[21] Appl. No.: 47,684

[22] Filed: May 7, 1987

Related U.S. Application Data

[63] Continuation of Ser. No. 803,670, Dec. 2, 1985, abandoned.

[30] Foreign Application Priority Data

Dec. 11, 1984 [DE] Fed. Rep. of Germany ....... 3445093

[51] Int. Cl.$^4$ ............................................. C08F 26/08
[52] U.S. Cl. ................................... 526/264; 523/106; 523/108; 526/307.1
[58] Field of Search ............... 523/106, 108; 526/264, 526/307.1

[56] References Cited

U.S. PATENT DOCUMENTS

| | | | |
|---|---|---|---|
| 3,316,224 | 4/1967 | Bestian et al. | 526/307.1 |
| 3,696,085 | 10/1972 | Lederer et al. | 526/264 |
| 4,703,097 | 10/1987 | Wingler et al. | 526/307.1 |

FOREIGN PATENT DOCUMENTS 0017512 10/1980 European Pat. Off. .

*Primary Examiner*—Joseph L. Schofer
*Assistant Examiner*—Alex H. Walker
*Attorney, Agent, or Firm*—Connolly and Hutz

[57] ABSTRACT

The invention relates to new cross-linked copolymers of N-vinyl pyrrolidone, N-alkyl-N-vinyl carboxylic acid amides, methacrylates and optionally further copolymerizing monomers of a specific compsition. The copolymers have a water absorption capacity of up to about 80% by weight, based on the hydrated state, and are suitable for the production of shaped articles which are in contact with living tissue in use. Examples include soft contact lenses and scleral lenses of high mechanical strength, in particular thin to very thin lenses for prolonged wear.

30 Claims, No Drawings

HYDROPHILIC COPOLYMERS, THE USE THEREOF AS BIOMEDICAL MATERIALS AND CONTACT-OPTICAL ARTICLES PRODUCED THEREFROM

This is a continuation of application Ser. No. 803,670 filed Dec. 2, 1985, now abandoned.

This invention relates to new cross-linked optically transparent interpenetrating network copolymers of N-vinyl pyrrolidone, N-alkyl-N-vinyl carboxylic acid amides, methacrylics and optionally further copolymerising monomers of specific composition and a process for their production. The copolymers have a water absorption capacity of up to about 80% by weight, based on the hydrated state, and are suitable for the production of shaped articles which are in contact with living tissue in use. Examples include soft contact lenses and scleral lenses of high mechanical strength, in particular thin to very thin lenses for prolonged wear.

Soft hydrophilic contact lenses composed of hydroxyethyl methacrylate (HEMA) were developed in the years from 1963 to 1965 (particularly in Czechoslovakia). Contact lens wearers accepted this type quite quickly owing to its pleasant feel in wear. The mechanical stress on the corneal tissue is lower with soft lenses than with hard lenses; moreover, the metabolism of the cornea is less affected.

The simple adaption, the short accustomation period and the high comfort in wear were decisive in causing soft hydrophilic lenses to dominate a considerable proportion of the market within a short time.

After more than a decade of experience with HEMA lenses, however, disadvantages of this group of materials have been discovered. Thus, after wearing hydrophilic HEMA lenses for a prolonged period, tolerance is impaired. The reasons for this are mainly the preservatives contained in polishes, the polishes in conjunction with the lens material and damaging effects of the material itself. HEMA materials can cause toxic injury to the eye. In clinical terms, such damage can be recognised by hyperemia in the limbus region and broadening of the peripheral network of looped vessels with varying pronounced corneal vascularisation in addition to the subjective discomfort expressed by the contact lens wearer. Corneal vascularisation is irreverible and occurs not infrequently without subjective discomfort. Residual monomers and crosslinking agents play a part here.

Similar phenomena can also be determined when wearing contact lenses composed of HEMA copolymers.

"HEMA-free" polymers or copolymers such as polyvinyl pyrrolidone or vinyl pyrrolidone/methyl methacrylate copolymers have been used for some time for highly hydrophilic contact lenses; they are supposed to be more compatible with the eye than HEMA lenses. These so-called hydrogel lenses are hydrophilic polymer networks based on water-soluble monomers which are capable of absorbing from 25 to over 70% by weight of water, based on the hydrated form, and which soften due to absorption of water. N-vinyl lactams combined with polyallyl crosslinking agents have gained significant importance among water-soluble monomers. The prior art includes, for example, U.S. Pat. Nos. 4,158,089, 4,361,657 and 4,341,198, and European Patents Nos. 79,720, 79,721, 106,650 as well as Shell Polym. 7 (1983), No. 3, pages 60–71. In comparison with lenses made of hard and semi-hard materials having a low water absorption capacity, for example polymethylmethacrylate, polysilyl methacrylates, cellulose acetobutyrate etc., soft hydrogel lenses are initially more comfortable in wear owing to their softness and adaptability, but have the disadvantage that they can easily be damaged mechanically. To increase the tensile strength, therefore, it was proposed that 0.9 to 5% by weight of methacrylic acid be added to the monomer mixture (European Patent No. 106 650). However, residual monomeric methacrylic acid in contact lens materials has a highly toxic effect, so a way of achieving high mechanical strength without addition of methacrylic acid must be sought. The comonomer methacrylic acid increases the affinity of polymers towards proteins and other metabolic products of the eye. Deposits, so-called "jelly bumps", thus easily form in the case of contact lenses composed of such materials.

With lenses composed of polymers containing N-vinyl lactam monomer, slight cloudiness and brown discolouration is frequently observed after prolonged wear.

Hydrophilic cross-linked copolymers have been found which are characterised in that they consist of (A) 28 to 70, preferably 45 to 65 parts by weight, of N-vinyl pyrrolidone, (B) 2 to 20, preferably 4 to 15 parts by weight, of an N-vinylamide of the general formula

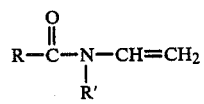

in which

R and R' independently represent $C_1$–$C_4$-alkyl groups, preferably methyl, (C) 10 to 70, preferably 20 to 51 parts by weight, of a methacrylic acid ester containing 1 to 8, preferably 1 to 6, carbon atoms in the alcohol portion, in particular methyl methacrylate, (D) 0 to 1, preferably 0.1 to 0.6 parts by weight, of a polyfunctional (meth)acrylic acid ester cross-linking agent, (E) 0.01 to 1.5, preferably 0.1 to 1.0 part by weight, of a polyfunctional vinyl or allyl crosslinking agent and optionally (F) 0 to 30 parts by weight of monomers which copolymerise with (A), (B) and (C).

The copolymers according to the invention have water absorption capacities of 25 to about 80% by weight, based on the hydrated state, depending on the quantitive ratio of the monomer components.

These new copolymers are suitable for use as contactoptical articles, in particular for thin to very thin lenses for prolonged wear. Owing to their high water content and their small thickness at the centre these lenses allow good transportation of oxygen and at the same time have high mechanical stability. They do not become cloudy on the eye and do not turn brown after prolonged wear and have no toxic side effects.

An essential factor is the combination of two hydrophilic monomers, N-vinyl pyrrolidone and N-alkyl-N-vinylamides, with methacrylates and cross-linking agents based on polyfunctional (meth)acrylic acid esters and polyfunctional vinyl and allyl compounds.

The above-mentioned polymer composition is particularly advantageous for an even balance in the properties of contact-optical articles produced from the materials according to the invention, in particular for high permeability to light and high stability in the hydrated state. In particular, the combination of the two water-soluble monomers vinyl pyrrolidone A) and N-vinyl amide B) in a ratio by weight of 1:0.03 to 1:0.7, as well as the content of E) of polyfunctional vinyl and allyl crosslinking agents is necessary for transparency and for radical stability in the hydrated state.

N-methyl-N-vinyl-amides of acetic acid, propionic acid and butyric acid are preferred as component B), N-methyl-N-vinyl acetamide is particularly preferred.

Aliphatic, cycloaliphatic, aromatic and araliphatic methacrylic acid esters are suitable as component C). Methyl methacrylate, ethyl methacrylate, n-, i- and t-butyl methacrylate, cyclohexyl methacrylate, phenyl and benzyl methacrylate are preferred. Methyl methacrylate is particularly preferred.

The monomers D) which are suitable according to the invention are known compounds which contain at least one further identical or different olefinically unsaturated group in addition to a (meth)acrylic ester group. These include acrylic acid and methacrylic acid esters of polyfunctional alcohols containing from 2 to 20 C-atoms, such as, for example, ethylene glycol dimethacrylate, diethylene glycol dimethacrylate, triethylene glycol dimethacrylate, polyethylene glycol dimethacrylate, 1,4-butane diol dimethacrylate, 1,6-hexane diol dimethacrylate, trimethylolpropane dimethacrylate, trimethylolpropane trimethacrylate, pentaerythritol tri- and tetramethacrylate, methyl-1,5-pentane diol dimethacrylate, neopentyl glycol dimethacrylate, methylene bis-methyacrylamide, as well as dihyrodicyclopentadienyl monomethacrylate, allyl methacrylate, vinyl methacrylate, bis-phenol-A-dimethacrylate and the corresponding acrylic acid ester.

The cross-linking agents (E) contain at least two olefinically unsaturated groups (vinyl or allyl groups), but no (meth)acrylic ester groups. Examples of these known monomers include butane diol divinylether, divinyl ethylene urea, divinyl propylene urea, 3,3-ethylidene-bis-(N-vinyl-2-pyrrolidone), divinyl adipate, divinyl benzene, divinyl phthalate, triallyl cyanurate, triallyl isocyanurate, diethylene glycol diallyl carbonate, dialkyl maleate, diallyl itaconate, trimethylolpropane di- and triallyl ether, triallyl trimellitate, N,N-diallyl melamines, etc. The combination of cross-linking agents (D) and (E) is important for transparency and radial stability of the lenses or shells produced from the copolymer and is also important for rendering only a small proportion of the material extractable with water.

Up to 30% by weight of further known monomers (F) which copolymerise wtih (A) and (B) and do not impair the intended application of the copolymers can be used, preferably instead of a proportion of (C) during production of the copolymer. Examples include, in particular, $C_1$-$C_{12}$-alkyl or cycloalkyl esters of acrylic acid or methacrylic acid, monohydroxy or dihydroxy-$C_2$-$C_6$-alkyl esters of (meth)acrylic acid, as well as alkyl ethers thereof, such as 2-hydroxyethyl methacrylate, 2-hydroxyethyl acrylate, 2,3-dihydroxypropyl methacrylate, 1,4-butane diol monoacrylate, 2-ethoxyethyl methacrylate, glycidyl methacrylate, vinyl acetate, vinyl propionate, vinyl laurate and vinyl versate. The ratio by weigh of (F) to (C) in the copolymer should not exceed the value of 1:0.5.

The cross-linking copolymerisation of monomers A) to (F) can be carried out by any conventional methods of radical polymerisation, for example initiated by heat, electron radiation, light or by radical-forming initiators. Electron beam radiation and light polymerisation are preferably used as described in detail in Int. chim. 1983, No. 242, pages 121–126 and in DE-OS No. 3,300,345. Polymerisation can be carried out as so-called block polymerisation in plate chambers but also in glass tubes or plastic cups. The cups can have the shape corresponding to the shaped article to be produced, for example the corresponding scope of the contact lens blank or also the finished lens. Polymerisation can also be carried out with addition uf up to 200% by weight, based on (A) to (F), of ethylene glycol which is subsequently washed out with water.

The polymers according to the invention generally have, in the dry state, a refractive index in the range $n_e = 1.5000$ to 1.5500, preferably 1.5100 to 1.,5300.

The polymers according to the invention reach their equilibrium water content in physiological sodium chloride solution, measured using discs measuring $10 \times 10$ mm and having a thickness of 1 mm, within 2 to 5 hours, preferably 3 o 4 hours.

The copolymers claimed are in the form of an interpenetrating network composed of a hydrophilic and a hydrophobic polymer and produced by simultaneous polymerisation.

The hydrophilic polymer component within the interpenetrating network copolymer consists predominantly of monomers (A) and (B). Monomers (A) and (B) have a similar copolymerisation reactivity and produce random copolymers. The hydrophobic polymer component within the interpenetrating network polymer consists predominantly of monomer (C). Owing to the fact that the polymer claims are crosslinked by the polyfunctional monomers D) and E) having cross-linking action, the hydrophilic and hydrophobic polymer components penetrate each other and cannot separate. The interpenetrating network is hard in the dry state. The transition from the glassy to the rubberelastic state is above 90° C. The polymer swells in water, thereby being able to absorb up to 4 times its own weight of water. Based on the hydrated state the water absorption capacity is between 40 to 80%, preferably 55 to 70% by weight.

A process for the production of the hydrophilic cross-linked copolymers according to the invention was also found which is characterised in that (A) 28 to 70 parts by weight of N-vinyl pyrrolidone (B) 2 o 20 parts by weight of an N-vinyl amide of the general formula

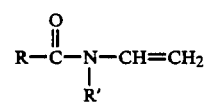

in which

R and $R^1$ independently represent $C_1$-$C_{14}$-alkyl groups, (C) 10.0 to 70 parts by weight of an ester of methacrylic acid containing 1 to 8, preferably 1 to 6 C-atoms in the alcohol portion, (D) 0 to 1 parts by weight of a polyfunctional (meth)acrylic acid ester cross-linking agent, (E) 0.01 to 1.5 parts by weight of a polyfunctional vinyl or allyl cross-linking agent and, optionally (F) 0 to 30 parts by weight of monomers which copolymerise with (A), (B) and (C) are polymerised by radical polymerisation in a temperature range of 20° to 120° C.

The process consists in the simultaneous crosslinking polymerisation of hydrophobic monomers (A) and (B) on the one hand and hydrophobic monomers (C) on the other hand. The reactivity constants of the two monomer groups (A) and (B), and (C) for radical copolymerisation are such that the copolymerisation of (A) and (B) with C is almost impossible. For example, the reactivity ratios of copolymerisation in the monomer mixture of methylmethacrylate (1) and N-vinyl pyrrolidone (2) are 4.7 for $r_1$ and 0.005 for $r_2$ (cf., on this subject, J. R. Bork and L. E. Colmann, S. Polym. Sci. 43, 413/1960)), and the reactivity ratios copolymerisation for the monomer mixture of methylmethacrylate (1) and N-methyl vinyl acetamide (2) are 4.9 for $r_1$ and 0.008 for $r_2$ (cf. G. P. Fischer and S. Lösinger, Makromol.Chem. 184, 1247, (1983)).

Theoretically vinyl pyrrolidone or N-methyl vinyl acetamide would probably not be incorporated into a copolymer until all of the methyl methacrylate has been consumed. What is in fact observed is that the cross-linked network already contains at the beginning of the polymerisation considerable incorporated amounts of vinyl pyrrolidone and N-methyl vinyl acetamide.

The polymerisation according to the invention is generally initiated by radical formers.

Possible radical formers are for example peroxides such as tert. -butyl perpivalate, di-cyclohexyl peroxydicarbonate, benzoyl perioxide, tert.-butyl peroctoate, lauryl peroxide, hydrogen periodixe, di-tert.-butyl peroxide and azo compounds such as azodiisobutyric acid dinitrile. The radical forming initiators are used in quantities of 0.01 to 0.1% by weight, based on the monomer mixture. Further radical formers are, for example, photoinitiators, such as, for example, benzoin isobutyl ether, benzil dimethylketal and camphorquinone, It is of course also possible to initiate the radical formation using light.

The polymerisation is carried out at temperatures from 20° to 80° C., preferably at 30° to 50° C. over a period of from 5 hours to 6 days.

The process can also be carried out in the presence of a swelling agent, such as ethylene glycol, methyl pyrrolidone, ethanol, dimethylsulphoxide or dimethyl formamide.

Owing to their excellent biological compatibility articles of a quite general nature which are intended to come into contact with living tissue can be produced from the copolymers according to the invention. Examples include lining materials in dental medicine or transparent wound coverings. A further application is the production of packaging films, in particular for foodstuffs. The material according to the invention is particularly suitable for the production of thin to very thin prolonged wear lenses. The term thin to very thin lenses includes lenses having a thickness at the centre thereof of from 0.03 to 0.15 mm in designs for minus lenses (for the correction of short sightedness); and from 0.08 to 0.3 mm in plus lenses (correction of long sightedness) and from 0.1 to 0.4 mm in aphakia lenses (correction of absence of lens). By flattening the edge regions of the internal surfaces of the lenses (aspherical design), it is possible to increase the exchange of tear fluid, as is already prior art nowadays in the case of hard lenses, and therefore to increase the lens tolerance on the eye. The small thickness attainable in the lenses allows increased permeability to oxygen and this is an advantage, in particular with prolonged wear lenses.

During production of thin to very thin lenses, it is also possible to add to the starting monomer mixture a quantity of water-soluble swelling agents such as ethylene glycol, dimethyl sulphoxide, dimethyl formamide, ethanol, etc., which corresponds to the subsequent water content and which can be exchanged for water after polymerisation. Lenses having a particularly smooth surface are obtained by polymerisation in so-called one-way or plastic cups made from injection-moulded inert materials such as polyethylene, polypropylene, polymethylpentene-1, polyamides, aromatic polyesters etc. However, the lenses can obviously also be produced in known manner from dry blanks by lace cutting methods.

The particular advantage of soft lenses made from the copolymer according to the invention residues in the fact that they do not become cloudy on the eye even after prolonged wear, do not turn brown and in addition to excellent eye tolerance have particular good radial stability and optical stability, and in contrast to polymers containing methacrylic acid they do not exhibit "jelly bump" deposits after prolonged wear.

In contrast to commercially available contact lenses based on N-vinyl pyrrolidone, lenses which are produced according to the invention contain no significant components which are extractable with water (the extractable content is less than 0.5% by weight).

The contact-optical articles (e.g. lenses) produced from the polymer according to the invention by cutting techniques using dry blanks can suprisingly be converted into the hydrated state in a reproducible manner.

PRODUCTION EXAMPLES

EXAMPLE 1

Monomer mixtures having the composition set out in the following table were charged into glass plate chambers measuring 250×250×5 mm, provided with a sealing thread under $N_2$ after careful degassing under vacuum and were irradiated for 6 days with a UV fluorescent lamp. The plates were tempered for 24 hours at 80° C. and then for 2 hours at 140° C. Blanks having diameters of 12.5 mm were punched from the plates and dialysed for 6 days in deionized water. After drying the blanks, contact lenses of varying thickness were cutted from them and polished.

|     | Composition in % by weight        | I     | II    | III   | IV    | V     |
|-----|-----------------------------------|-------|-------|-------|-------|-------|
| (A) | N—vinyl pyrrolidone               | 55    | 55    | 50    | 50    | 60    |
| (B) | N—methyl vinyl acetamide          | 5     | 10    | 10    | 5     | 5     |
| (C) | methyl methacrylate               | 39.99 | 33.99 | 33.99 | 33.99 | 33.99 |
| (D) | 2-hydroxyethyl methacrylate       | —     | —     | 5     | —     | —     |
| (F) | methacrylic acid-2-oxyethylethylester | — | —     | —     | 5     | —     |
| (D) | ethylene glycol dimethylacrylate  | 0.5   | 0.5   | 0.5   | 0.5   | 0.5   |
| (E) | triallyl cyanurate divinyl adipate | 0.5  | 0.5   | —     | 0.5   | 0.5   |
| (F) | azodiisobutyric acid dinitrile    | 0.01  | 0.01  | 0.01  | 0.01  | 0.01  |
|     | water absorption capacity based on hydrated state | 54 | 62 | 68 | 56 | 62 |

-continued

| Composition in % by weight | I | II | III | IV | V |
| --- | --- | --- | --- | --- | --- |
| (% by weight) | | | | | |

EXAMPLE 2

Monomer mixtures having the composition stated in the table below were degassed in vacuo and charged in a bubble free manner into tubes composed of polypropylene, measuring 12.5 mm×6 cm, and provided wth a plunger was stayed with a spring so that a pressure of about 0.4 bars of excess pressure was present in the tube. The tubes were irradiated with fluorescent light for three days in an incubator with circulating air at an airbath temperature of 40° C., after which they were tempered at 80° C. for 24 hours, emptied and the blank was allowed to swell in water. The swollen blank was cut into discs which were dried in order to determine the water absorption capacity. From the dried blanks contact lenses which swell in water to become soft lenses were produced by cutting.

| | Composition in % by weight | VI | VIII | VIII | IX |
| --- | --- | --- | --- | --- | --- |
| (A) | N—vinyl pyrrolidone | 55 | 55 | 65 | 55 |
| (B) | N—methyl vinyl acetamide | 15 | 15 | 7 | 17 |
| (C) | methyl methacrylate | 30 | 30 | 28 | 28 |
| | dimethyl formamide | 40 | — | — | — |
| (D) | ethylene glycol-dimethacrylate | 0,1 | 0,1 | — | 0,5 |
| (E) | triallyl cyanurate | 1,0 | 1,0 | 1,0 | 0,7 |
| | benzoin isobutyl ether | 0,05 | 0,05 | 0,05 | 0,05 |
| | water absorption capacity based on a hydraed state % by weight | 68 | 64,7 | 64,8 | 67 |

EXAMPLE 3

Measurement of the internal radii of the contact lenses produced from polymers I to IX from Example 1 and 2 at centre thickness of up to 0.08 mm yield good radial stability (variations <0.1 mm). Smears and cloudiness could not be detected during slit lamp testing.

EXAMPLE 4

Light permeability: 90% at a layer thickness of 4.7 mm. To determine the content which was extractable with water, a dry 5 mm thick platelet was stored for 6 days under flowingde-ionized water, then dried for 24 hours at 80° C. and 2 hours at 140° C. and re-weighed. The weight loss was less than 0.5% in each case.

EXAMPLE 5

Animal tests on rabbits' eyes demonstrated good biological compatibility of the material with the eye even after 21 days of continuous wear.

EXAMPLE 6

When selected subjects in whom there was a particular tendency towards the deposition of "jelly-bumps" on commercially available polyvinyl pyrrolidone contact lenses were tested a greatly reduced tendency towards deposition was observed even after a prolonged period of wear (several months).

EXAMPLE 7

Refractive index of polymers (in the dry state) and hydration Polymer VI: Refractive index $n_e = 1.5165$ The equilibrium water content, measured using a 1 mm thick disc in physiological sodium chloride solution was reached after: 3 hrs. Polymer VIII: Refractive index: $n_e 1.5231$ The equilibrium water content, measured using a 1 mm thick disc in physiological sodium chloride solution was reached after: 3.5 hrs.

We claim:
1. A hydrophilic cross-linked copolymer have a water absorption capacity of 25 to about 80 parts by weight based on the hydrated state, and consisting essentially copolymerized monomeric units:
   (A) 28 to 70 parts by weight of N-vinyl pyrrolidone,
   (B) from 2 to 20 parts by weight of N-methyl-vinyl acetamide,
   (C) 10.0 to 70 parts by weight of an ester of methacrylic acid containing 1 to 8 carbon atoms in the alcohol portion,
   (D) 0 to 1 part by weight of a polyfunctional (meth)acrylic acid ester cross-linking agent,
   (E) 0.01 to 1.5 parts by weight of a polyfunctional vinyl or allyl cross-linking agent, and
   (F) 0 to 30 parts by weight of monomers which copolymerize with (A), (B) and (C).
2. A hydrophilic cross-linked copolymer according to claim 1 having a water absorption capacity of 40 to 80 parts by weight, based on the hydrated state.
3. A copolymer according to claim 1, characterised in that the content of component (A) is 45 to 65 parts by weight.
4. A copolymer according to claim 1, characterised in that the content of component (B) is 4 to 15 parts by weight.
5. A copolymer according to claim 1, characterised in that the content of component (C) is 20 to 51 parts by weight.
6. A copolymer according to claim 1, characterised in that the content of component (D) is 0.1 to 0.5 parts by weight.
7. A copolymer according to claim 1, characterised in that the content of component (E) is 0.1 to 1.0 part by weight.
8. A copolymer according to claim 1, characterised in that component (C) is methyl methacrylate.
9. Contact optical articles which directly contact living tissue in use which comprise the hydrophilic cross-linked copolymer having a water absorption capacity of 25 to about 80 parts by weight, based on the hydrated state, and comprising as copolymerized monomeric units:
   (A) 28 to 70 parts by weight of N-vinyl pyrrolidone,
   (B) from 2 to 20 parts by weight of N-methyl-vinyl acetamide,
   (C) 10.0 to 70 parts by weight of an ester of methacrylic acid containing 1 to 8 carbon atoms in the alcohol portion,
   (D) 0 to 1 part by weight of a polyfunctional (meth) acrylic acid ester cross-linking agent,
   (E) 0.01 to 1.5 parts by weight of a polyfunctional vinyl or allyl cross-linking agent, and
   (F) 0 to 30 parts by weight of monomers which copolymerize with (A), (B) and (C).
10. Contact optical articles according to claim 9 wherein the content of component (A) is 45 to 65 parts by weight.

11. Contact optical articles according to claim 9 wherein the content of component (B) is 4 to 15 parts by weight.

12. Contact optical articles according to claim 9 wherein the content of component (C) is 20 to 51 parts by weight.

13. Contact optical articles according to claim 9 wherein the content of component (D) is 0.1 to 0.5 parts by weight.

14. Contact optical articles according to claim 9 wherein the content of component (E) is 0.1 to 1.0 parts by weight.

15. Contact optical articles according to claim 9 wherein component (C) is methyl methacrylate.

16. Contact optical article according to claim 9 wherein the article is a hydrophilic soft lense.

17. Contact optical article according to claim 16 wherein the lense has a thickness at its center of from 0.03 to 0.15 mm for a minus lense and from 0.08 to 0.3 mm for a plus lense.

18. Contact optical article according to claim 9 wherein the article is a scleral lense.

19. Contact optical article according to claim 9 wherein the article is an aphakia lense with a center thickness of from 0.1 to 0.4 mm.

20. A cylindrical disc-shaped blank for use in the manufacture of contact optical articles which comprises a hydrophilic cross-linked copolymer having a water absorption capacity of 25 to about 80 parts by weight, based on the hydrated states, and comprising as copolymerized monomeric units:
(A) 28 t 70 parts by weight of N-vinyl pyrrolidone,
(B) from 2 to 20 parts by weight of N-methyl-vinyl acetamide,
(C) 10.0 to 70 parts by weight of an ester of methacrylic acid containing 1 to 8 carbon atoms in the alcohol portion,
(D) 0 to 1 part by weight of a polyfunctional (meth) acrylic acid ester cross-linking agent,
(E) 0.01 to 1.5 parts by weight of a polyfunctional vinyl of allyl cross-linking agent, and
(F) 0 to 30 parts by weight of monomers which copolymerize with (A), (B) and (C).

21. A blank according to claim 20 wherein the content of component (A) is 45 to 65 parts by weight.

22. A blank according to claim 20 wherein the content of component (B) is 4 to 15 parts by weight.

23. A blank according to claim 20 wherein the content of component C) is 20 to 51 parts by weight.

24. A blank according to claim 20 wherein the content of component (D) is 0.1 to 0.5 parts by weight.

25. A blank according to claim 20 wherein the content of component E) is 0.1 to 1.0 parts by weight.

26. A blank according to claim 20 wherein component (C) is methyl methacrylate.

27. A process for the production of hydrophilic, cross-linked copolymers as claimed in claim 1 wherein:
(A) 28 to 70 parts by weight of N-vinyl pyrrolidone,
(B) 2 to 20 parts by weight of N-methyl-vinyl acetamide,
(C) 10.0 to 70 parts by weight of an ester of methacrylic acid containing 1 to 8 carbon atoms in the alcohol portion,
(D) 0 to 1 parts by weight of a polyfunctional (meth) acrylic acid ester cross-linking agent,
(E) 0.01 to 1.5 parts by weight of a polyfunctional vinyl or allyl cross-linking agent, and
(F) 0 to 30 parts by weight of monomers which copolymerize with (A), (B) and (C), are polymerized by radical polymerization in a cylindrical vessel equipped with a plunger under a pressure of about 0.4 bar provided by the plunger, under fluorescent light for about three days at about 40° C., whereupon the vessel is emptied and the polymer allowed to swell in water.

28. A process for the production of hydrophilic, cross-linked copolymers as claimed in claim 1 wherein monomers (A) through (F) are copolymerized in the presence of up to 200 parts by weight of ethylene glycol by radical polymerization at about 20° to 120° C.

29. In the method of preparing a contact lense from a polymeric blank by cutting the blank to a predetermined configuration, the improvement comprises cutting a polymeric blank as claimed in claim 20 to a center thickness of from 0.03 to 0.15 mm for a minus lense and 0.08 to 0.3 mm for a plus lense.

30. In a method of increasing the supply of oxygen to eye tissue of a contact lense wearer, the improvement compises said lense being a lense as claimed in claim 16.

* * * * *